(12) United States Patent
Park

(10) Patent No.: US 8,830,602 B2
(45) Date of Patent: Sep. 9, 2014

(54) FOCUSING APPARATUS FOR OPTICAL DEVICE

(71) Applicant: Samsung Electronics Co., Ltd., Gyeonggi-do (KR)

(72) Inventor: Joong-Wan Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/747,760

(22) Filed: Jan. 23, 2013

(65) Prior Publication Data

US 2013/0222929 A1    Aug. 29, 2013

(30) Foreign Application Priority Data

Feb. 24, 2012   (KR) .................. 10-2012-0019069

(51) Int. Cl.
*G02B 7/02* (2006.01)
*G02B 15/14* (2006.01)

(52) U.S. Cl.
USPC ........... 359/823; 359/694; 359/696; 396/144; 348/357

(58) Field of Classification Search
USPC ........ 359/823, 824, 694–704; 396/72–79, 85, 396/89, 133, 144, 529; 348/207.1, 333.01, 348/335, 357, 361, E5.022; 33/290–292
See application file for complete search history.

(56) References Cited

U.S. PATENT DOCUMENTS

| | | | |
|---|---|---|---|
| 5,150,260 A * | 9/1992 | Chigira | 359/694 |
| 5,815,325 A * | 9/1998 | Johnson | 359/696 |
| 6,456,444 B1 * | 9/2002 | Yumiki et al. | 359/696 |
| 6,618,211 B2 * | 9/2003 | Yumiki et al. | 359/696 |
| 6,654,557 B2 * | 11/2003 | Kikuchi et al. | 396/144 |
| 7,173,772 B2 * | 2/2007 | Masuda | 359/696 |
| 7,197,240 B2 * | 3/2007 | Uemura et al. | 396/72 |
| 2006/0245309 A1 | 11/2006 | Saito | |
| 2010/0232014 A1 | 9/2010 | Huang | |

FOREIGN PATENT DOCUMENTS

| | | |
|---|---|---|
| EP | 1 959 296 A1 | 8/2008 |
| JP | 09-43475 A | 2/1997 |
| JP | 11-295578 A | 10/1999 |
| KR | 10-2011-0007312 A | 1/2011 |
| KR | 10-2011-0028080 A | 3/2011 |
| KR | 10-2011-0032267 A | 3/2011 |

* cited by examiner

*Primary Examiner* — Loha Ben
(74) *Attorney, Agent, or Firm* — Cha & Reiter, LLC.

(57) ABSTRACT

Provided is a focusing apparatus for an optical device, the focusing apparatus including a lead screw rotatably installed in the optical device, a carriage screw-coupled to the lead screw to move in a longitudinal direction of the lead screw in response to rotation of the lead screw, a lens barrel receiving at least one lenses and moving along the longitudinal direction of the lead screw, and a bridge extending from an outer circumferential surface of the lens barrel to enclose the carriage, in which the bridge moves the lens barrel in response to movement of the carriage.

13 Claims, 3 Drawing Sheets

FOCUSING APPARATUS FOR OPTICAL DEVICE

CLAIM OF PRIORITY

This application claims the benefit under 35 U.S.C. §119(a) of a Korean Patent Application filed in the Korean Intellectual Property Office on Feb. 24, 2012 and assigned Serial No. 10-2012-0019069, the entire disclosure of which is hereby incorporated by reference.

BACKGROUND OF THE INVENTION

1. Technical Field of the Invention

This disclosure generally relates to an optical device such as for example, but not limited to an image capturing device or a beam projector, and more particularly, to a focusing apparatus of a subminiature optical device which can be mounted on a small device such as a portable terminal.

2. Description of the Related Art

Optical devices may be classified into image capturing devices and image projecting devices such as beam projectors. The image capturing device includes an image sensor, while the image projecting device includes a light source and a liquid crystal panel, but they include in common a lens group including at least one lens in an image input or output path. Optical devices are typically utilized within an independent device such as a camera or a beam projector. Recently, with the wide spread use of portable terminals such as a mobile communication terminal, the optical device has also been mounted on the portable terminal.

A camera mounted on a portable terminal has been used to capture a still image or a moving image, and recently, the camera has been used to realize virtual reality with local information, neighboring shopping center information, etc., through the portable terminal. There has been an increased desire and need to attempt to mount an image projecting device, such as a beam projector, which has been realized and portable terminals equipped with a beam projector function have now released in the market. The beam projector can implement a large screen relative to its size, thus being variously used in conferences, performances, etc. In large beam projectors which are generally provided as independent units and installed in public spaces such as halls, conference rooms, and so forth, a position sensor for sensing a position of a focus is installed, however in a miniaturized device such as a portable terminal, it is difficult to install the position sensor due to special restrictions. Therefore, for installation in a limited space, a focusing apparatus capable of performing stable focusing without the need to install the position sensor is required.

FIG. 1 is a plane view of a focusing apparatus 100 for an optical device according to an embodiment of conventional prior art, and FIG. 2 is a view for describing a focusing operation of the focusing apparatus 100 shown and described with respect to FIG. 1.

As shown in FIGS. 1 and 2, a focusing apparatus 100 for an optical device, specifically, a beam projector according to an embodiment of conventional prior art performs focusing as a lens barrel 101, receiving at least one lens, linearly moves in a direction along the optical axis. To guide linear movement of the lens barrel 101, the focusing apparatus 100 includes guide rods 119. The guide rods 119 are positioned at both sides of the lens barrel 101 and are coupled with guide members 111a and 111b formed at both sides of the lens barrel 101 in such a way to go through the guide members 111a and 111b. The guide members 111a and 111b slide together with the lens barrel 101 in a direction in which the guide rods 119 extend.

As a driving means for linearly moving the lens barrel 101, a dial structure or a lever structure for directly providing a driving force by a user may be used, or a structure using a driving motor such as a step motor or a servo motor may be used. In the embodiment shown in FIG. 1, to provide the driving force for linearly moving the lens barrel 101, the focusing apparatus 100 includes a driving motor 121, a lead screw 102 rotated by the driving motor 121, and a bracket 123 for mounting the driving motor 121 and at the same time, for rotatably installing the lead screw 102. The focusing apparatus 100 also includes a carriage 103 screw-coupled with the lead screw 102.

The carriage 103 linearly moves in a longitudinal direction of the lead screw 102 as the lead screw 102 rotates, and as a link arm 131 formed on the outer circumferential surface of the carriage 103 is interfered with by at least one of the guide members 111a and 111b, the guide members 111a and 111b also linearly move together with the carriage 103. Therefore, as the driving motor 121 operates, the lead screw 102 rotates, linearly moving the carriage 103, such that the carriage 103 linearly moves the guide members 111a and 111b and the lens barrel 111 through the link arm 131.

However, in the focusing apparatus structured as described above, due to manufacturing and assembly tolerances between parts, interworking between the link arm and the guide members is not precise. That is, due to manufacturing and assembly tolerances between parts, there is a difference generated between a movement distance of the carriage based on the operation of the driving motor and an actual movement distance of the lens barrel. Moreover, due to the hysteresis caused by accumulated manufacturing and assembly tolerances between parts, during focusing, in spite of switch of the moving direction of the carriage, the lens barrel maintains a stationary state, such that even if the carriage moves in a direction and then returns to its initial position, the lens barrel fails to return to its initial position. Furthermore, due to many restrictions in installation of the position sensor of the lens barrel in a miniaturized device such as a portable terminal, a difference between a movement distance of the carriage and a movement distance of the lens barrel makes it difficult to control the driving motor. In addition, since the link arm and the guide member does not contact in a sufficient area to provide accurate rigid support, tilt of the lens barrel occurs during movement of the lens barrel as shown in FIG. 2, such that the lens barrel may become misaligned with respect to the optical axis.

SUMMARY OF THE INVENTION

Accordingly, an exemplary aspect of the present invention provides a focusing apparatus which accurately delivers an operation of a driving motor to an operation of a lens barrel by minimizing manufacturing and assembly tolerances between parts.

Another exemplary aspect of the present invention also provides a focusing apparatus which minimizes a backlash phenomenon occurring when the moving direction is switched or reversed while suppressing tilt of a lens barrel, and facilitates linear movement of the lens barrel.

According to another exemplary aspect of the present invention, there is preferably provided a focusing apparatus for an optical device, the focusing apparatus including a lead screw rotatably installed in the optical device, a carriage screw-coupled to the lead screw to move in a longitudinal direction of the lead screw in response to rotation of the lead screw, a lens barrel receiving at least one lenses and moving along the longitudinal direction of the lead screw, and a bridge extending from an outer circumferential surface of the lens barrel to enclose the carriage, in which the bridge moves the lens barrel in response to movement of the carriage.

BRIEF DESCRIPTION OF THE DRAWINGS

The above and other exemplary features and advantages of certain exemplary embodiments of the FOCUSING APPARATUS FOR OPTICAL DEVICE according to the present invention will be more apparent to a person of ordinary skill in the art from the following detailed description taken in conjunction with the accompanying drawings, in which.

DETAILED DESCRIPTION OF THE EXEMPLARY EMBODIMENT

Figure 1:
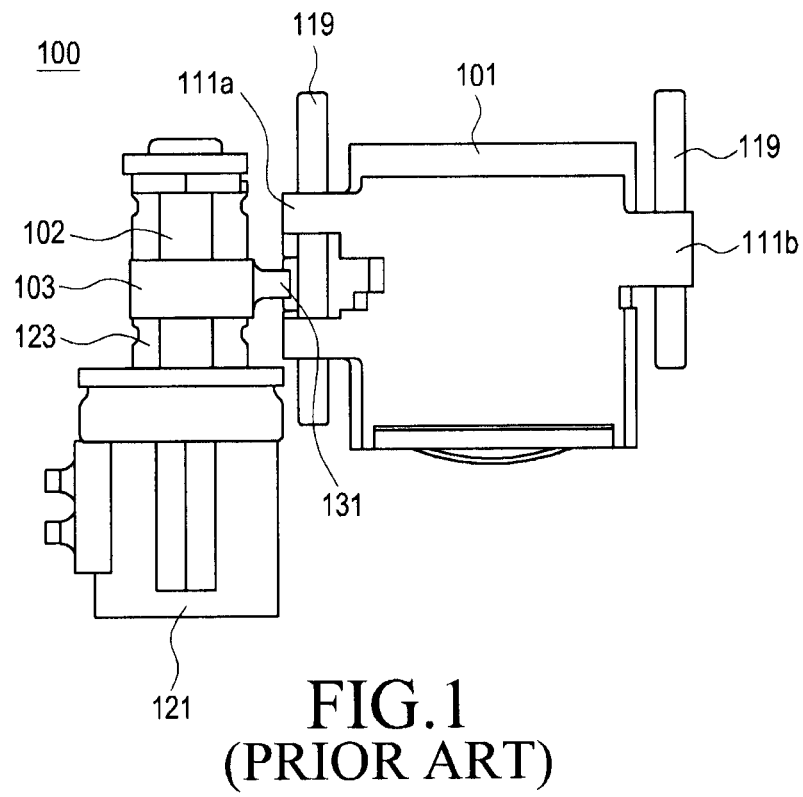
FIG. 1 is a plane view of a focusing apparatus for an optical device according to an embodiment of conventional prior art.
Figure 2:
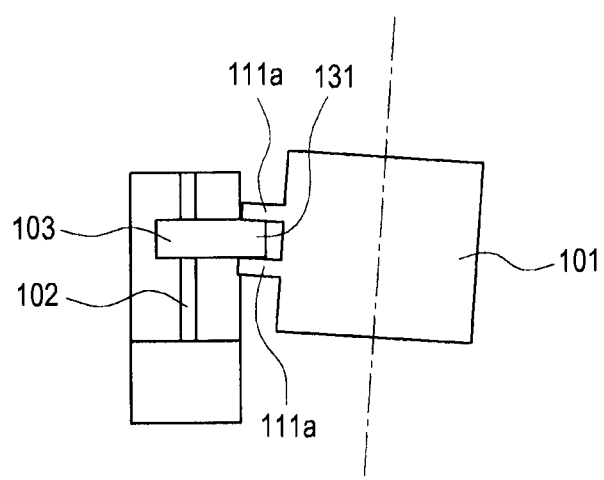
FIG. 2 is a view for describing a focusing operation of a focusing apparatus shown in FIG. 1.
Figure 3:
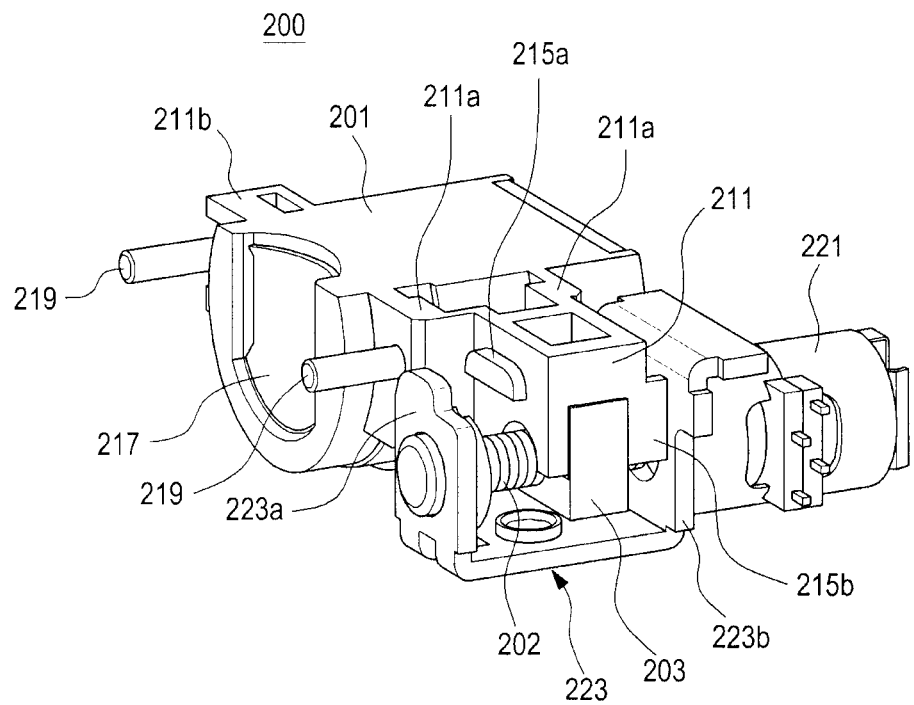
FIG. 3 is a perspective view of a focusing apparatus for an optical device according to an exemplary embodiment of the present invention.

Hereinafter, an exemplary embodiment of the present invention will now be described in detail with reference to the accompanying drawings. In the following description, well-known functions or structures will not be described in detail if they may unnecessarily obscure appreciation of the subject matter of the present invention by a person of ordinary skill in the art. Also, the terms used herein are defined according to the functions of the present invention as would be understood by a person of ordinary skill in the art. Thus, the terms may vary depending on user's or operator's intension and usage. That is, the terms used herein must be understood based on the descriptions made herein in view of the ordinary level of skill in the art.

The present invention described hereinafter provides, as shown in FIGS. 3 through 6, a focusing apparatus 200 for an optical device which includes a lead screw 202, a carriage 203, a lens barrel 201, a bridge 211, and a protrusion portion 213.

The lead screw 202 has a screw thread on its outer circumferential surface, and is rotatably mounted on a housing 209 of an optical device, such as e.g., a beam projector. The lead screw 202 may be rotated directly by a user using a dial or by a separate driving motor. To rotate the lead screw 202, in a detailed embodiment of the present invention, the focusing apparatus 200 includes a driving motor 221 which may be a stepping motor. To mount the lead screw 202 and the driving motor 221 on the housing 209, the focusing apparatus 100 may include a bracket 223.

The bracket 223 is fixed on the housing 209, and both ends thereof are bent to face each other, thus forming a pair of support pieces 223a and 223b. Both ends of the lead screw 202 are rotatably coupled to one of the support pieces 223a and 223b, and the driving motor 221 is mounted on an outer side of the support pieces 223a and 223b. The lead screw 202 substantially forms a driving axis of the driving motor 221. That is, the operation of the driving motor 221 rotates the lead screw 202.

The carriage 203 is screw-coupled to the lead screw 202, such that as the lead screw 202 rotates, the carriage 203 moves in a longitudinal direction of the lead screw 202. That is, the carriage 203 cannot rotate with respect to the bracket 223, but moves in the longitudinal direction of the lead screw 202 between the support pieces 223a and 223b as the lead screw 202 rotates. Therefore, the rotation of the lead screw 202 is switched to linear reciprocation of the carriage 203.

The lens barrel 201 receives a lens group including at least one lens 217, and is positioned to linearly move in the housing 209. To guide linear movement of the lens barrel 201, the housing 209 may include a rail groove which partially encloses the outer circumferential surface of the lens barrel 201, but in a detailed embodiment of the present invention, a guide structure using guide rods 219 is shown. The guide rods 219 are disposed at both sides of the lens barrel 201, and are coupled with guide members 211a and 211b formed on the outer circumferential surface of the lens barrel 201 in such a way to go through the guide members 211a and 211b through through-holes 211c formed in the guide members 211a and 211b. The guide members 211a and 211b, together with the lens barrel 201, move in the longitudinal direction of the lead screw 202 by being guided by the guide rods 219.

To keep the optical axis of a lens 217 received in the lens barrel 201 in parallel with the guide rods 219, the guide member 211a in at least one side of the lens barrel 201 is formed as a pair in spaced positions. One of the guide rods 219 is disposed to go through a pair of guide members 211a formed in the spaced positions at one side of the lens barrel 201. Thus, the lens barrel 201 is prevented from being twisted or rotated with respect to the guide rod 219. That is, the lens barrel 201 can only linearly reciprocate in parallel with the optical axis direction, i.e., the longitudinal direction of the lead screw 202. By disposing the guide members 219 at both sides of the lens barrel 201, the movement of the lens barrel 201 is limited to linear reciprocation parallel with the longitudinal direction of the lead screw 202 as the guide member 211a must remain in linear straight line alignment along the guide rod 219.

Figure 4:
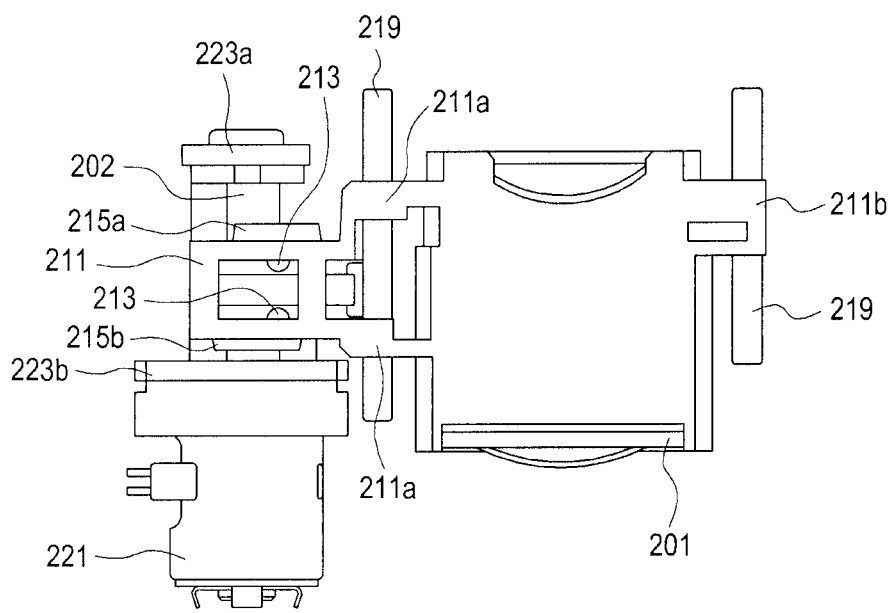
FIG. 4 is a plane view showing a focusing apparatus shown in FIG. 3.
Figure 5:
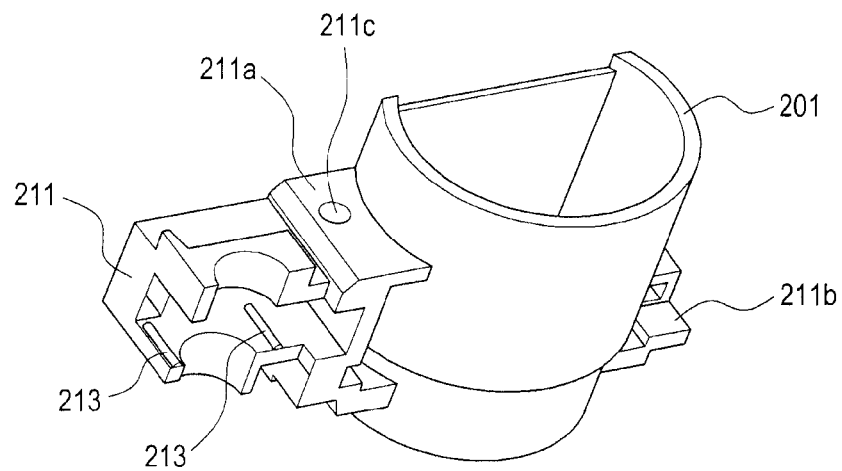
FIG. 5 is a perspective view of a lens barrel of a focusing apparatus shown in FIG. 3.
Figure 6:
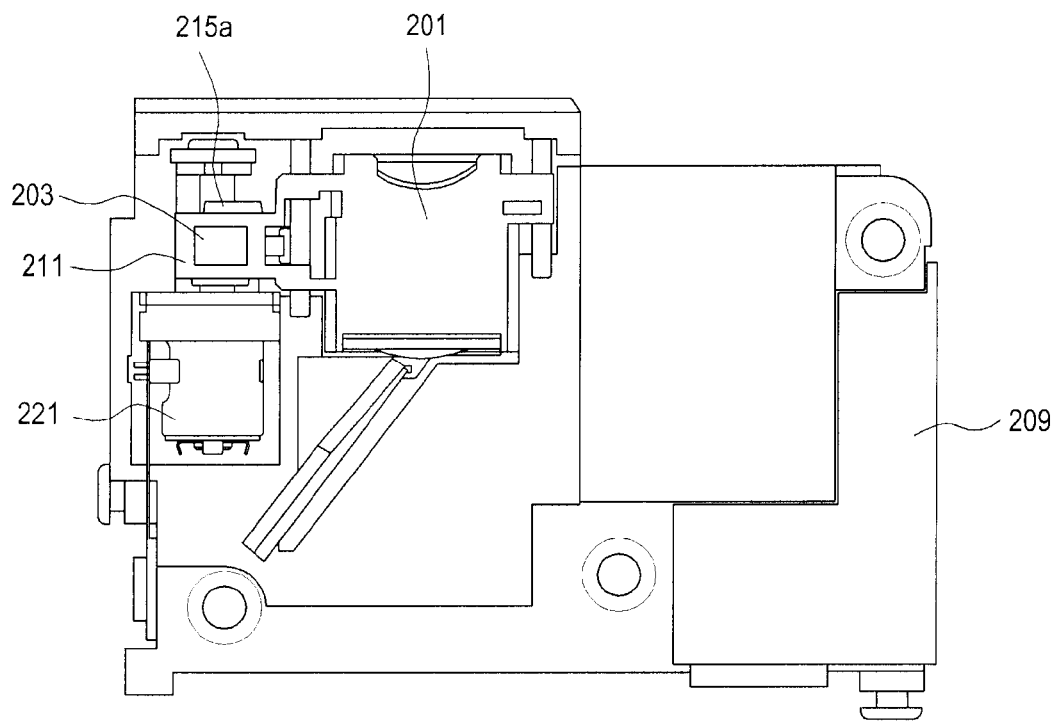
FIG. 6 is a plane view showing a state where a focusing apparatus shown in FIG. 3 is installed in an optical device.

The bridge 211 extends from the outer circumferential surface of the lens barrel 201 or from the guide member 211a at one side to enclose the carriage 203. That is, the linear movement of the carriage 203 acts as a driving force for linearly moving the lens barrel 201 through the bridge 211. The bridge 211 is provided to completely enclose the carriage 203, such that when viewed in the plane view as shown in FIG. 4, the bridge 211 preferably encloses the lead screw 202 at left and right sides of the lead screw 202. In other words, the bridge 211 extends from the outer circumferential surface of the lens barrel 201 by a sufficient length traversing the lead screw 202 generally in a direction perpendicular to the longitudinal direction of the lead screw 202. As shown in FIG. 5, the bridge 211 may be formed to partially receive the lead screw 202.

The protrusion portion 213 protrudes from an inner circumferential surface of the bridge 211 in such a way to closely contact a surface of the carriage 203. Thus, in spite of a manufacturing or assembly tolerance in each of the bridge 211 and the carriage 203, the bridge 211 and the carriage 203 can be coupled without a gap therebetween by the protrusion portion 213 with no influence based upon an assembly yield or tolerance. In this way, the movement distance of the carriage 203 and the linear movement distance of the lens barrel 201 can be more closely matched to each other, and most preferably, can be equal to each other. In addition, the bridge 211 is coupled to enclose the carriage 203 without a gap therebetween, thereby substantially preventing tilt of the lens barrel 201 with respect to the carriage 203.

As such, by providing a guide structure by means of the guide rod 219 and the guide members 211a and 211b and a coupling structure between the carriage 203 and the bridge 211 by means of the protrusion portion 213, the lens barrel 201 makes stable linear movement in response to the movement of the carriage 203, while tilt thereof is suppressed.

At least one, preferably one or more pairs of protrusions 213 are formed to face a surface of the carriage 203 in the longitudinal direction of the lead screw 202. In addition, by forming the protrusion portion 213, the bridge 211 and the carriage 203 more closely contact each other, such that if facing protrusion portions are formed on both surfaces of the carriage 203, friction in the assembly process is reduced, facilitating assembly of the bridge 211 and the carriage 203. That is, at least one pair of the protrusion portions 213 are formed to face one of the both surfaces of the carriage 203 in the longitudinal direction of the lead screw 202, respectively.

For example, as shown in FIGS. 4 and 5, the protrusion portions 213 are formed as two pairs; in the longitudinal direction of the lead screw 202, one pair being disposed to face each other on a first surface of the carriage 203 and the other pair being disposed to face each other on a second surface of the carriage 203. The protrusion portions 213 may have a form of a linear band extending in perpendicular to the longitudinal direction of the lead screw 202 on the inner circumferential surface of the bridge 211.

In another alternate embodiment, the protrusion portions 213 may include dots in a hemispherical shape protruding from the inner circumferential surface of the bridge 211. When the protrusion portions 213 are composed of only one dot or a pair of dots, it is likely that the bridge 211 and the carriage 203 are assembled in an inclined state; if so, the lens barrel 201 is disposed inclinedly with respect to the longitudinal direction of the lead screw 202, which hinders movement of the lens barrel 201 in the optical axis direction. Therefore, when the protrusion portions 213 are composed of dots, the number of dots facing one surface of the carriage 203 is preferably 3 or more. When the protrusion portions 213 are formed to face both surfaces of the carriage 203, six or more dots may form the protrusion portions 213. In this way, consistent alignment of the lens barrel 201 along the optical axis can be maintained The movement range of the lens barrel 201 is limited substantially by the bracket 223. More specifically, the bridge 211 is coupled to the carriage 203 to enclose the carriage 203, such that movement ranges of the carriage 203 and the bridge 211 are limited by the support pieces 223a and 223b supporting both ends of the lead screw 202. Substantially like the movement range of the carriage 203, the movement range of the lens barrel 201 is also limited to a similar extent by the support pieces 223a and 223b forming a part of the bracket 223.

For rotatable support by means of the support pieces 223a and 223b, unless a screw thread is partially formed on both ends of the lead screw 202, then a screw thread of the carriage 203 may leave the screw thread of the lead screw 202 in a state where the carriage 203 is positioned close to any one end portion of the lead screw 202 along the threads. If the screw thread of the carriage 203 leaves the screw thread of the lead screw 202, the carriage 203 cannot rotate in spite of rotation of the lead screw 202. Thus, it is desirable to limit the movement range of the carriage 203 such that the carriage 203 moves up to a position leaving a predetermined distance from the both ends of the lead screw 202 so that the threads of the carriage 203 and the lead screw 202 are always engaged.

To this end, stoppers 215a and 215b may be formed on the outer circumferential surface of the bridge 211. In a detailed embodiment of the present invention, a pair of stoppers 215a and 215b protrude from the outer circumferential surface of the bridge 211 and are disposed to face each other in the longitudinal direction of the lead screw 202. Therefore, the first stopper 215a of the stoppers 215a and 215b is disposed to face the first support piece 223a of the support pieces 223a and 223b, and the second stopper 215b is disposed to face the second support piece 223b. When the stoppers 215a and 215b are formed on the bridge 211, the movement range of the bridge 211, and further, the movement range of the lens barrel 201 are limited substantially by the stoppers 215a and 215b and the support pieces 223a and 223b. The stoppers 215a and 215b, when viewed on the plane view shown in FIG. 4, are preferably disposed along the center axis of the lead screw 202. That is, the stoppers 215a and 215b are disposed from a side of the lead screw 202 to the other side of the lead screw 202 through the lead screw 202, i.e., to an offset position between the lead screw 202 and towards the lens barrel 201. Thus, at a moment when one of the stoppers 215a and 215b contacts the support pieces 223a and 223b, the tilt of the lens barrel 201 may be prevented. Herein, it should be noted that 'a side of the lead screw 202', when viewed on the plane view shown in FIG. 4, may mean that a left end of the first stopper 215a is positioned on a right side with respect to a left end of the lead screw 202.

As such, manufacturing and assembly tolerances are removed by forming the protrusion portions between the carriage and the bridge, and the stoppers formed in the bridge are disposed from the side of the lead screw to the position between the lead screw and the lens barrel through the lead screw, such that stable linear movement of the lens barrel is guided and tilt and backlash can be suppressed.

As is apparent from the foregoing description, in the focusing apparatus of the optical device structured as described above, the protrusion portions are formed in the bridge coupled with the carriage to closely contact the carriage, thereby minimizing manufacturing and assembly tolerances, such that the operation of the driving motor is accurately delivered to the operation of the lens barrel, facilitating control of the driving motor for adjusting the position of the lens barrel without installation of the position sensor. Moreover, by screw-coupling the carriage to the lead screw in such a way that the bridge encloses the carriage, the movement direction of the carriage and the driving direction of the lens barrel are maintained in parallel alignment according to disposition of the lead screw, suppressing the tilt of the lens barrel. In addition, by disposing one pair of guide rods, linear movement of the lens barrel in a state of being aligned with the optical axis can be stably guided.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A focusing apparatus for an optical device, the focusing apparatus comprising:
   a lead screw rotatably installed in the optical device;

a carriage coupled to the lead screw to move in a longitudinal direction of the lead screw in response to rotation of the lead screw;

a lens barrel receiving at least one lens and moving along the longitudinal direction of the lead screw;

a bridge extending from an outer circumferential surface of the lens barrel to enclose the carriage, and one or more protrusion portions protruding from an inner surface of the bridge to form a close tolerance fit with an outer side surface of the carriage, wherein the bridge moves the lens barrel in response to movement of the carriage.

2. The focusing apparatus of claim 1, wherein the bridge extends to traverse the lead screw.

3. The focusing apparatus of claim 1, wherein the one or more protrusion portions include at least one protrusion portion that is formed to protrude toward the outer side surface of the carriage.

4. The focusing apparatus of claim 1, wherein the one or more protrusion portions include at least one pair of protrusion portions that is formed to protrude toward respective locations of the outer side both surface of the carriage.

5. The focusing apparatus of claim 1, wherein at least one of the one or more protrusion portions is formed to protrude toward one surface of the carriage, and has a shape of a linear band extending in a direction perpendicular to the longitudinal direction of the lead screw.

6. The focusing apparatus of claim 1, wherein at least one of the one or more protrusion portions is formed to protrude toward one surface of the carriage, and has a hemispherical shape protruding from the inner surface of the bridge.

7. The focusing apparatus of claim 1, further comprising a bracket threadedly engaged with and supporting both ends of the lead screw, wherein the bridge linearly moves together with the carriage in a distance range limited by the bracket.

8. The focusing apparatus of claim 7, further comprising a stopper protruding from an outer circumferential surface of the bridge, wherein the stopper limits a linear movement range of the bridge by contact with the bracket.

9. The focusing apparatus of claim 8, wherein the stopper is disposed at a side of the lead screw and at a position offset from the lead screw and towards the lens barrel.

10. The focusing apparatus of claim 7, further comprising a driving motor attached to the lead screw and mounted on an outer side of the bracket, wherein the driving motor rotates the lead screw.

11. The focusing apparatus of claim 10, wherein the driving motor is a stepping motor.

12. The focusing apparatus of claim 7, further comprising:

guide members formed on an outer circumferential surface of the lens barrel; and guide rods disposed in parallel alignment with the lead screw, wherein each of the guide rods is slidably coupled to go through one of the guide members, thus guiding linear movement of the lens barrel.

13. The focusing apparatus of claim 12, wherein the guide rods include a pair of guide rods that are disposed along opposing sides of the lens barrel.

* * * * *

UNITED STATES PATENT AND TRADEMARK OFFICE
CERTIFICATE OF CORRECTION

| | | |
|---|---|---|
| PATENT NO. | : 8,830,602 B2 | Page 1 of 1 |
| APPLICATION NO. | : 13/747760 | |
| DATED | : September 9, 2014 | |
| INVENTOR(S) | : Joong-Wan Park | |

It is certified that error appears in the above-identified patent and that said Letters Patent is hereby corrected as shown below:

In the Claims,

Column 7, Claim 4, Line 22 should read as follows:
--...the outer side surface...--

Signed and Sealed this
Second Day of December, 2014

Michelle K. Lee
*Deputy Director of the United States Patent and Trademark Office*